J. A. HILLIKER.
EGG CASE OR CARRIER.
APPLICATION FILED JAN. 12, 1910.

1,084,859.

Patented Jan. 20, 1914.

Witnesses
E. Larson
M. T. Taylor

Inventor
J. A. Hilliker,
By Beeler & Robb
Attorneys.

UNITED STATES PATENT OFFICE.

JOHN A. HILLIKER, OF EVANSTON, ILLINOIS.

EGG CASE OR CARRIER.

1,084,859.  Specification of Letters Patent.  Patented Jan. 20, 1914.

Application filed January 12, 1910. Serial No. 537,739.

*To all whom it may concern:*

Be it known that I, JOHN A. HILLIKER, a citizen of the United States, residing at Evanston, in the county of Cook and State of Illinois, have invented certain new and useful Improvements in Egg Cases or Carriers, of which the following is a specification.

The present invention consists of an improved form of filler designed to be used for egg cases and cartons, and of the general type embodying crossed interlocking strips forming the walls of the cells of the filler.

The object of this invention has been to design a peculiar construction of filler of the above class wherein the strips constituting the walls of the cells are peculiarly constructed to provide cushioning seats adapted to receive and hold the eggs by a positive spring or yielding pressure.

A further object of the invention is to provide a filler adapted particularly for use by egg packing establishments where millions of eggs annually are packed preparatory to shipment, the present invention affording an article which may be produced at exceedingly small cost, and wherein the cellular structure of the filler is so formed as to permit of insertion of the eggs into the cells practically by dropping the eggs in position and with the exercise of very little force.

Figure 5:
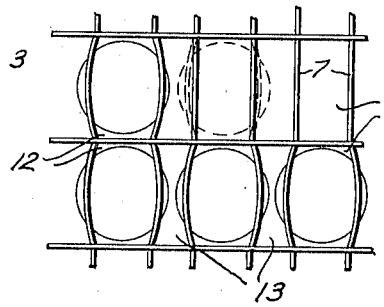

More specifically speaking, the present invention embodies a cellular egg filler of the general type above referred to, in which each cell comprises opposite egg supporting walls which are spaced apart a less distance than the largest transverse diameter of the average egg, so as to engage the latter by positive spring pressure as above premised, the entrance portions to the cells of the filler being formed by opposite portions of the egg supporting walls and being freely movable outwardly from one another so as to afford practically no resistance whatever to the insertion of the eggs into the cells. When, however, the eggs have dropped into seats provided in the egg supporting walls, the material from which said walls are made is sprung or bulged outwardly and transversely, as shown in Fig. 5, placing the previously freely yielding entrance portions to the cells under tension sufficient to reduce their flexibility to such an extent that they will effectively prevent the displacement of the eggs received in the seats unless a positive removal pressure is exerted upon said eggs.

For a full understanding of the invention, reference is to be had to the following detail description and to the accompanying drawings, in which—

Figure 1:
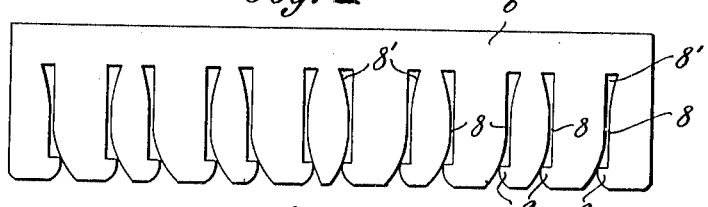
Figure 2:
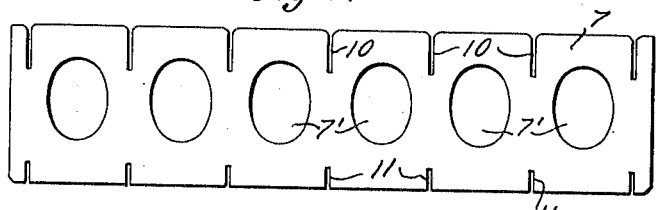
Figure 3:
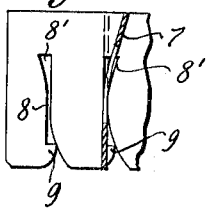
Figure 6:
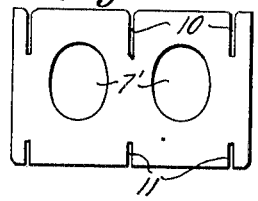
Figure 4:
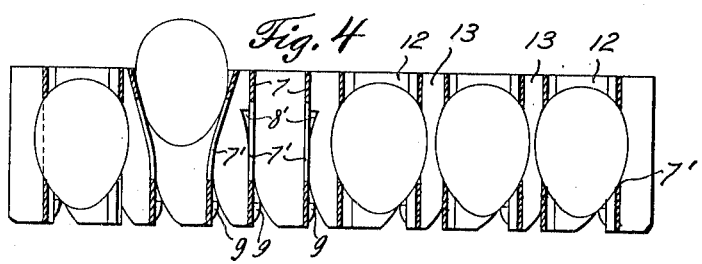

Figure 1 is a view in elevation of one of the bracing and locking strips of a filler section; Fig. 2 is a view similar to Fig. 1 showing one of the egg supporting strips; Fig. 3 is a fragmentary view partly in section bringing out clearly the advantageous yieldability of the upper portions of the egg supporting walls of the filler; Fig. 4 is a sectional view showing eggs arranged in position in the filler, one of the eggs being illustrated in the operation of introducing the same into one of the cells of the filler; Fig. 5 is a fragmentary top plan view showing how the eggs are firmly held in position spaced from one another and supported by the cushioning walls or sides of each cell; Fig. 6 is a view in elevation, similar to Fig. 2, showing a short egg supporting strip adapted for use for a small, narrow egg carrier.

Throughout the following detail description and on the several figures of the drawings, similar parts are referred to by like reference characters.

Many considerations enter into the manufacture of egg fillers and especially those involving the cost of material and the machine work required for manufacturing the fillers in enormous quantities. The present filler is adapted to be made from what is known as chip-board. It may be made of much cheaper grades of paper board because the peculiar formation of the egg seats with relation to the slits by which the strips of the filler are interlocked permits use of the cheaper grades of paper board.

For the purposes of this description, the filler 3 may be described as comprising a plurality of connecting strips 6 and a plurality of egg supporting strips or walls 7 arranged transversely to the connecting strips. The connecting strips have vertical slits 8 extending from their lower edges and locking tongues 9 are formed at one side of the lower portions of said slits. The egg supporting strips 7 are formed with elliptical openings 7' intermediate of their upper and lower edges, and said openings form egg seats adapted to receive and engage the opposite side portions of the eggs with a firm yielding pressure. The strips 7 have slits 10 extending from their upper edges and said slits terminate at their lower ends at points opposite to the upper ends of the egg seats 7'.

The arrangement of the slits 10 of the egg supporting strips 7 is such as to permit interlocking of the strips 6 and 7 by coöperation of the slits 8 and 10. The slits 10, however, are peculiarly related to the egg seats 7' in that they terminate opposite the upper ends of the egg seats as above mentioned. The purpose of this construction is to form entrance portions or flaps above the several egg seats, said flaps consisting of the entire portions of the strips 7 located above the openings 7', these portions of the strips 7 being movable in opposite directions to separate the upper ends of each pair of egg seats 7' as the egg enters a cell and is received by said seats in the manner shown in Fig. 4. The arrangement of the slits 10 with respect to the openings 7', however, is such as to cause the yielding portions above the openings or seats 7' to return to their original positions after being moved apart when the egg enters a cell, and once returned to their original vertical positions, these yielding portions of the strips 7 above the seats 7' firmly hold the egg from displacement even when the filler is inverted.

The upper ends of the slits 8 are transversely widened as shown at 8' in order that the flap portions of the egg supporting strips located above the seats 7' may yield apart on a gradual curve, by movement with the portions of the strips between the seats, as shown in Fig. 3, instead of being caused to bend at a sharp angle with respect to the body portion of the strip 7 and thereby cause the fiber of the material from which the filler is made to be broken, reducing the spring pressure of the portions of the strips 7 forming the yieldable flaps above the seats 7'.

From the foregoing it will be understood that while the eggs will practically gravitate by their own weight into the cells of the filler, which is highly advantageous in reducing the time required by packers in placing eggs in fillers or packages ready for market, the liability of accidental displacement of the eggs is eliminated. The tension placed on the flaps or entrance portions of each cell by the outward pressure of the egg against the egg seats is found sufficient to hold the eggs in place even though the filler be inverted and dropped.

Having thus described my invention, what is claimed as new is:

1. An egg case comprising a filler consisting of a cellular structure, each wall of said structure embodying spaced egg supporting walls formed intermediate their upper and lower ends with opposite egg seats, said egg supporting walls being formed at their upper ends with free outwardly movable flaps partially separated from the body of the egg supporting wall to offer practically no resistance to the introduction of an egg into the cell, the egg supporting seats of said walls being so arranged beneath said entrance flaps and the said walls themselves being so spaced apart as to cause the body of each wall to be curved or bulged transversely when the egg is in engagement with the seats thereof, said walls thus placing the entrance flaps under tension, reducing their flexibility and preventing accidental displacement of the eggs through the entrance flaps of the walls.

2. An egg case comprising a filler composed of egg supporting strips and transversely arranged connecting strips, the egg supporting strips being formed with a plurality of openings intermediate their upper and lower edges constituting egg seats and having slits extending downwardly from their upper edges midway between the egg supporting seats and terminating at a point substantially opposite the upper ends of the latter providing opposite yieldable pressure flaps above the egg seats, coacting supporting strips being spaced a less distance than the transverse diameter of the average egg whereby the seat portions of the strips are outwardly bulged and under tension when the eggs are engaged thereby, said flaps being movable apart to facilitate dropping of the eggs into the egg seats and then returning to their original positions to prevent upward displacement of the eggs from their seats.

3. As a new article of manufacture, a filler for eggs comprising transversely arranged egg supporting and connecting strips, the egg supporting strips being parallel and formed with openings intermediate their upper and lower edges and constituting egg seats, the egg supporting strips being provided with a plurality of slits leading inwardly from an edge portion thereof and located midway between the egg seats, said slits terminating at points substantially opposite the upper ends of the egg seats rendering the portions of the egg supporting strips just above the egg seats yieldable to facilitate dropping of eggs into the egg seats, the egg supporting strips being so spaced as to firmly engage the eggs by spring pressure thereagainst, the connecting strips having a plurality of slits also and which extend from the edge thereof opposite that edge of the egg supporting strips having the slits above mentioned, the slits of the connecting strips coacting with those of the egg supporting strips to interlock all of the strips of the filler and the inner ends of the slits of the connecting strips being widened whereby to permit the portions of the egg supporting strips between the egg seats to yield slightly with those portions above the egg seats in entering the eggs into the filler.

In testimony whereof I affix my signature in presence of two witnesses.

JOHN A. HILLIKER.

Witnesses:
J. F. ROBB,
S. E. DODGE.

Copies of this patent may be obtained for five cents each, by addressing the "Commissioner of Patents, Washington, D. C."